(12) United States Patent
Yousef (10) Patent No.: US 7,974,364 B2
(45) Date of Patent: Jul. 5, 2011

(54) DOPPLER FREQUENCY ESTIMATION AND ADAPTATION FOR MOBILE MULTIMEDIA MULTICAST SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 588 days.

(21) Appl. No.: 12/110,688

(22) Filed: Apr. 28, 2008

(65) Prior Publication Data

US 2009/0323790 A1    Dec. 31, 2009

(51) Int. Cl.
H04L 27/00    (2006.01)
(52) U.S. Cl. ........................................................ 375/316
(58) Field of Classification Search .................. 375/259, 375/316, 324, 142, 143, 150, 152, 343, 354, 375/357, 369, 372, 373, 374; 379/387.02; 324/607; 341/126, 127, 128, 155, 156, 159; 704/216, 218, 237, 263; 708/5, 422, 813; 342/108, 145, 189, 378; 370/395.62, 507; 455/265; 702/89; 713/375, 400
See application file for complete search history.

(56) References Cited

U.S. PATENT DOCUMENTS

| | | | |
|---|---|---|---|
| 2006/0215778 A1* | 9/2006 | Murthy et al. | 375/260 |
| 2008/0273481 A1* | 11/2008 | Chang | 370/311 |
| 2009/0060093 A1* | 3/2009 | Narahari et al. | 375/340 |

* cited by examiner

*Primary Examiner* — Sam K Ahn
(74) *Attorney, Agent, or Firm* — Rahman LLC

(57) ABSTRACT

A technique for Doppler frequency estimation and adaptation in a MediaFLO™ (Forward Link Only) receiver system includes receiving Orthogonal Frequency Division Multiplexing (OFDM) symbols in the receiver, dividing a Doppler frequency range into N ranges corresponding to N interpolation filters; determining a correlation between two OFDM symbols separated by time; estimating a Doppler frequency by the correlation of OFDM symbols; determining a ratio of the correlation of OFDM symbols; comparing the determined ratio of the correlation of OFDM symbols with a look up table of $\alpha$ stored at a receiver to determine a corresponding Doppler frequency; mapping $\alpha$ ranges stored at the look up table to suitable interpolation filters; estimating an interpolation filter from the mapped $\alpha$ ranges mapped against determined $\alpha$ ratio; adapting Time Domain Interpolation (TDI) to the selected interpolation filter; and synchronizing receiver to the TDI filter.

20 Claims, 7 Drawing Sheets

DOPPLER FREQUENCY ESTIMATION AND ADAPTATION FOR MOBILE MULTIMEDIA MULTICAST SYSTEMS

BACKGROUND

1. Technical Field

The embodiments herein generally relate to wireless communications, and, more particularly, to a method for Doppler Frequency Estimation and Adaptation for MediaFLO™ (Forward Link Only) system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting-Terrestrial (ISDB-T), Terrestrial-Digital Multimedia Broadcasting (T-DMB), Satellite-Digital Multimedia Broadcasting (S-DMB), Digital Video Broadcasting-Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount.

For instance, in a typical communication receiver design, the sampling time of the receiver is usually not commensurate with that of the transmitter, and a carrier and time offset exists between the transmitter and the receiver. Therefore, the resulting carrier and time offset need to be estimated and then corrected to ensure reliable quality communication. Similarly, in Orthogonal Frequency Division Multiplexing (OFDM) based communication systems like the MediaFLO™ system for mobile TV broadcasting applications, the phase difference between successive OFDM symbols are first taken on corresponding pilots to obtain a fine estimate of the carrier and time offset, and the channel frequency response are then estimated and equalized. However, in MediaFLO™ receiver design, since the OFDM pilots exists every other OFDM symbols, the carrier offset estimation range are limited to +/−0.25 OFDM sub carrier spacing, which corresponds to about +/−340 Hz carrier frequency offset. In practice this range might not be sufficient.

SUMMARY

In view of the foregoing, an embodiment herein provides a method for Doppler frequency estimation and adaptation in a MediaFLO™ receiver system, and a program storage device readable by computer, tangibly embodying a program of instructions executable by the computer to perform a method for Doppler frequency estimation and adaptation in a MediaFLO™ receiver system, wherein the method comprises, receiving a wireless data stream comprising a MediaFLO™ mobile multimedia multicast system superframe comprising OFDM symbols; dividing a Doppler frequency range into N ranges corresponding to N interpolation filters; determining a correlation $\Re(\tau)$ between two OFDM symbols separated by time $\tau$; estimating a Doppler frequency $f_D$ by the correlation of OFDM symbols; determining correlation ratio $\alpha$ of OFDM symbols; comparing the determined ratio of the correlation of OFDM symbols with a look up table stored at a receiver to determine a corresponding Doppler frequency; mapping $\alpha$ ranges stored at look up table to suitable interpolation filters; estimating an interpolation filter from the mapped $\alpha$ ranges mapped against determined $\alpha$ ratio; adapting Time Domain Interpolation (TDI) to the selected interpolation filter; and synchronizing receiver to MediaFLO™ system superframe and the transmitted OFDM symbols based on the adapted TDI filter.

Preferably, determining a correlation $\Re(\tau)$ between two OFDM symbols separated by time $\tau$ is expressed by: $\Re(\tau)=E\lfloor h(n)h(n-\tau)*\rfloor=\sigma_h^2 \Im_0(2\pi f_D \tau)$, where $E\lfloor h(n)h(n-\tau)*\rfloor$ is an expectation value of symbols h(n) and symbol h(n−τ), $\sigma_h^2$ is a factor that depends on noise added to transmitted symbol h(n), and $\Im_0(2\pi f_D \tau)$ is a Bessel function of a first kind of order 0. Further, correlation $\Re(\tau)$ between two OFDM symbols comprises obtaining a correlation $r_1$ between OFDM symbols n and n+2 and obtaining a correlation $r_2$ between OFDM symbols n and n+4.

Further more, determining the correlation $\alpha$ ratio of OFDM symbols further comprising, the value of $\alpha$ is based on instantaneously determined values of $\alpha$. Further for determining a correlation $\Re(\tau)$ and determining the correlation $\alpha$ ratio, computing $\alpha$ ratio of correlation of OFDM symbols based on formula $\alpha=(r2/r1)=(\Im_0(2\pi f_D*4\tau)/\Im_0(2\pi f_D*2\tau))$. Further, the instantaneously determined $\alpha$ is $\alpha_{instantaneous}$, and wherein determined $\alpha$ ratio is calculated by: $\alpha_{new}=\lambda*\alpha_{instantaneous}+(1-\lambda)*\alpha_{old}$, where $\lambda$ is a dependency factor of $\alpha_{new}$ on instantaneous calculated $\alpha$. The value of $\lambda$ is large in a beginning stage in which receiver synchronizes with a transmitter and $\alpha_{new} \approx \alpha_{instantaneous}$.

Another embodiment includes an apparatus for Doppler frequency estimation and adaptation in a MediaFLO™ receiver system, wherein the apparatus comprising a processing module for receiving a wireless data stream comprising a MediaFLO™ mobile multimedia multicast system superframe comprising OFDM symbols; dividing a Doppler frequency range into N ranges corresponding to N interpolation filters; determining a correlation $\Re(\tau)$ between two OFDM symbols separated by time $\tau$; estimating a Doppler frequency $f_D$ by the correlation of OFDM symbols; determining correlation ratio $\alpha$ of OFDM symbols; comparing the determined ratio of the correlation of OFDM symbols with a look up table stored at a receiver to determine a corresponding Doppler frequency; mapping $\alpha$ ranges stored at look up table to suitable interpolation filters; estimating an interpolation filter from the mapped $\alpha$ ranges mapped against determined $\alpha$ ratio; adapting Time Domain Interpolation (TDI) to the selected interpolation filter; and synchronizing receiver to MediaFLO™ system superframe and the transmitted OFDM symbols based on the adapted TDI filter.

Preferably, a processing module for determining a correlation $\Re(\tau)$ between two OFDM symbols separated by time $\tau$ is expressed by: $\Re(\tau)=E\lfloor h(n)h(n-\tau)*\rfloor=\sigma_h^2 \Im_0(2\pi f_D \tau)$, where $E\lfloor h(n)h(n-\tau)*\rfloor$ is an expectation value of symbols h(n) and symbol h(n−τ), $\sigma_h^2$ is a factor that depends on noise added to transmitted symbol h(n), and $\Im_0(2\pi f_D \tau)$ is a Bessel function of a first kind of order 0. Further, correlation $\Re(\tau)$ between two OFDM symbols comprises obtaining a correlation $r_1$ between OFDM symbols n and n+2 and obtaining a correlation $r_2$ between OFDM symbols n and n+4.

Further, a processing module for determining the correlation $\alpha$ ratio of OFDM symbols further comprising, the value of $\alpha$ is based on instantaneously determined values of $\alpha$. Further determining a correlation $\Re(\tau)$ and determining the correlation $\alpha$ ratio, computing $\alpha$ ratio of correlation of OFDM symbols based on formula $\alpha=(r2/r1)=(\Im_0(2\pi f_D*4\tau)/\Im_0(2\pi f_D*2\tau))$. Further more, the instantaneously determined $\alpha$ is $\alpha_{instantaneous}$, and wherein determined $\alpha$ ratio is calculated by: $\alpha_{new}=\lambda*\alpha_{instantaneous}+(1-\lambda)*\alpha_{old}$, where $\lambda$ is a dependency factor of $\alpha_{new}$ on instantaneous calculated $\alpha$. The value of $\lambda$ is large in a beginning stage in which receiver synchronizes with a transmitter and $\alpha_{new} \approx \alpha_{instantaneous}$.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique of carrier frequency estimation and timing estimation using interpolated pilots. Accordingly, there remains a need for a novel Doppler frequency estimation technique that permits estimation of high to further increase the fine carrier frequency estimation range in MediaFLO™ receiver design to about +/−0.5 OFDM sub carrier spacing, which corresponds to about +/−680 Hz at almost no complexity increment. Referring now to the drawings, and more particularly to FIGS. 1 through 8, where similar reference characters denote corresponding features consistently throughout the figures, there are shown preferred embodiments.

Figure 1:
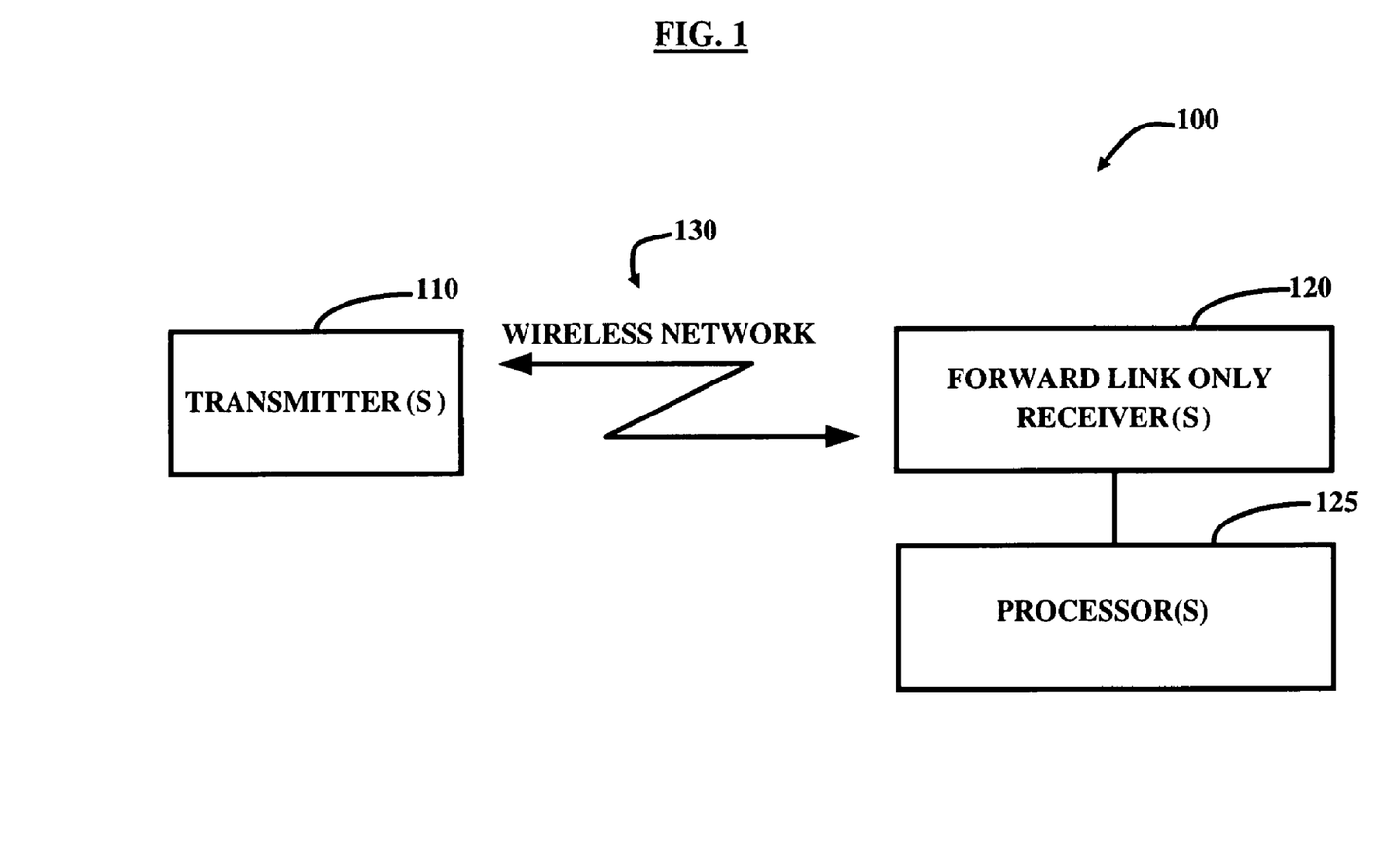
FIG. 1 is a schematic diagram illustrating a MediaFLO™ system used in accordance with the embodiments herein.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 110 that communicate across a wireless network 130 to one or more receivers 120. One or more processors 125 may be operatively connected to the one or more receivers 120 to facilitate processing of computer instructions to be utilized by the one or more receivers 120.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T).

To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

MediaFLO™ is a pilot-aided OFDM system. The subset of carriers in the OFDM symbols carries pilot symbols known to the receiver in order to be used for channel estimation and correction. The carriers dedicated to the pilot symbols are known as the pilots.

Channel mode is a mode that describes the phenomena like fading, multi-path, etc. that affects the transmitted information along its path to the receiver. These phenomena changes continuously and these changes can be described by a factor called Doppler frequency which is the change in frequency and wavelength of the received signal. In order to estimate the channel, the received signal after taking the Fast Fourier Transform (FFT) is divided by the pilot symbols at the pilot locations. This gives an initial estimate of the channel at these locations which is then interpolated to obtain the channel at all the active carrier locations. Then, channel correction is performed and a soft estimate of the data obtained.

Figure 2:
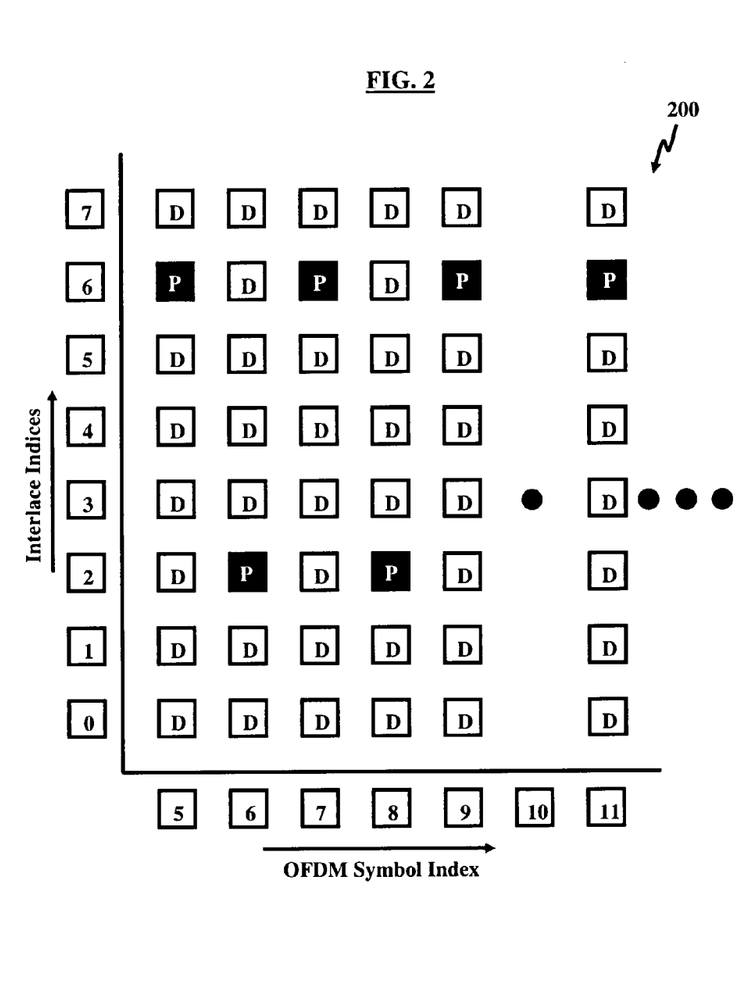
FIG. 2 illustrates a schematic diagram of FDM pilots interlacing in a MediaFLO™ system according to an embodiment herein.
Figure 3:
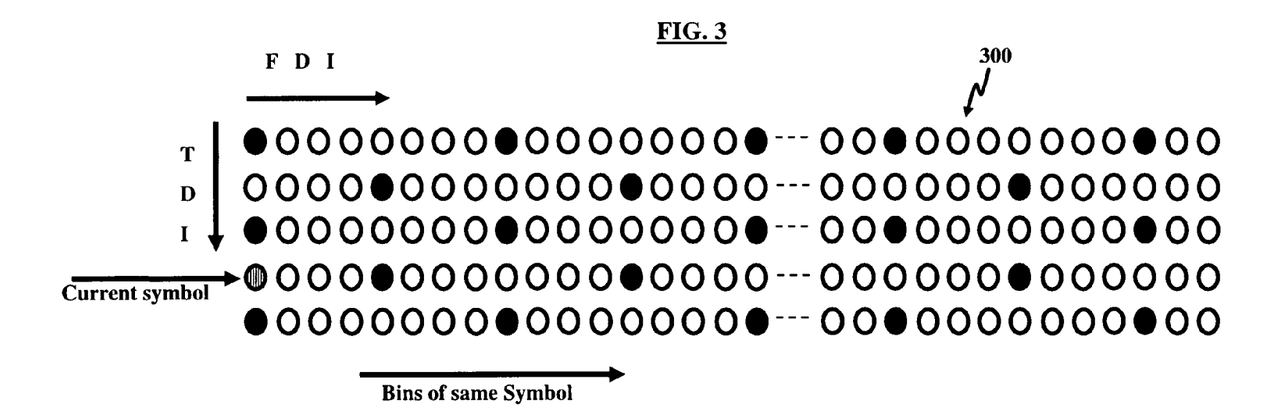
FIG. 3 is a graphical representation of Time Domain Interpolation (TDI) and Frequency Domain Interpolation (FDI) between pilot symbols according to an embodiment herein.
Figure 4:
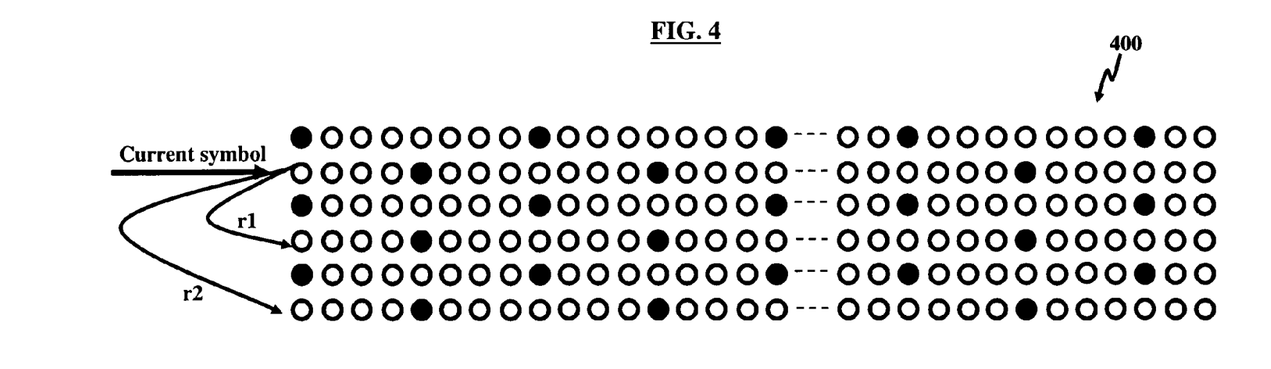
FIG. 4 illustrates pilot symbols and selection of n, n+2, and n+4 symbols according to an embodiment herein.

The FDM pilots 200 are either in interlace 2 for even OFDM symbol indices or in interlace 6 for odd OFDM symbol indices as shown in FIG. 2. Interpolation is a method of constructing new data points within the range of a discrete set of known data points which are the pilot symbols, the dependency on successive pilot symbols is performed using a filter known as an interpolation filter. Interpolation is performed between channel estimates at the pilot symbols' locations to be able to get the channel mode at all the indices. Interpolation is performed in two steps as shown in FIG. 3. First, interpolation is performed along the OFDM symbol index direction in time domain between successive pilot symbols 300, which is called Time Domain Interpolation (TDI). Then, interpolation is performed along the interlace index direction between interlace indices of the same symbol called Frequency Domain Interpolation (FDI). The problem arises in TDI due to channel effects that varies continuously along OFDM symbols, such that one interpolation filter may be suitable in certain channel model variations but not suitable in another. Accordingly, the embodiments herein adapt interpolation filters in the presence of continual model variations.

The Doppler frequency range is divided into N ranges corresponding to N interpolation filters 601 (of FIG. 6) such that when the symbols are received at the receiver end Doppler frequency is estimated, according to 1 of N ranges is chosen and the corresponding interpolation filter (i.e., Filter 1 . . . Filter N) is determined. The correlation between two symbols separated by time τ and has Doppler Frequency $f_D$ can be described by the following equation:

$$\mathfrak{R}(\tau)=E[h(n)h(n-\tau)^*]=\sigma_h^2 \mathfrak{I}_0(2\pi f_D \tau) \qquad (1)$$

where, $\mathfrak{R}(\tau)$ is the correlation of two symbols separated by time τ. $E[h(n)h(n-\tau)^*]$ is the expectation value of symbols h(n) and symbol h(n−τ). $\sigma_h^2$ is a factor that depends on noise added to transmitted symbol h(n). $\mathfrak{I}_0(2\pi f_D \tau)$ is Bessel function of first kind of order 0.

Equation (1) can be used by correlating two symbols separated by time τ and comparing correlation result with the Bessel function tables, but the noise factor $\sigma_h^2$ still exists which is of unknown value. In order to remove $\sigma_h^2$ dependency, the Doppler frequency is estimated by finding the following relations as shown in the pilot symbol structure 400 of FIG. 4: (i) getting correlation $r_1$ between symbol n and n+2 (i.e., delay by 2 symbols); and (ii) getting correlation $r_2$ between symbol n and symbol n+4 (i.e., delay by 4 symbols). When the ratio of correlation between $r_1/r_2$ is determined (i.e., using divider 603 (of FIG. 6)), the noise factor $\sigma_h^2$ is removed from Equation (1) and the value of α is found by the following equation:

$$\alpha = (r2/r1) = (\Im_0(2\pi f_D * 4\tau)/\Im_0(2\pi f_D * 2\tau)) \quad (2)$$

Figure 5:
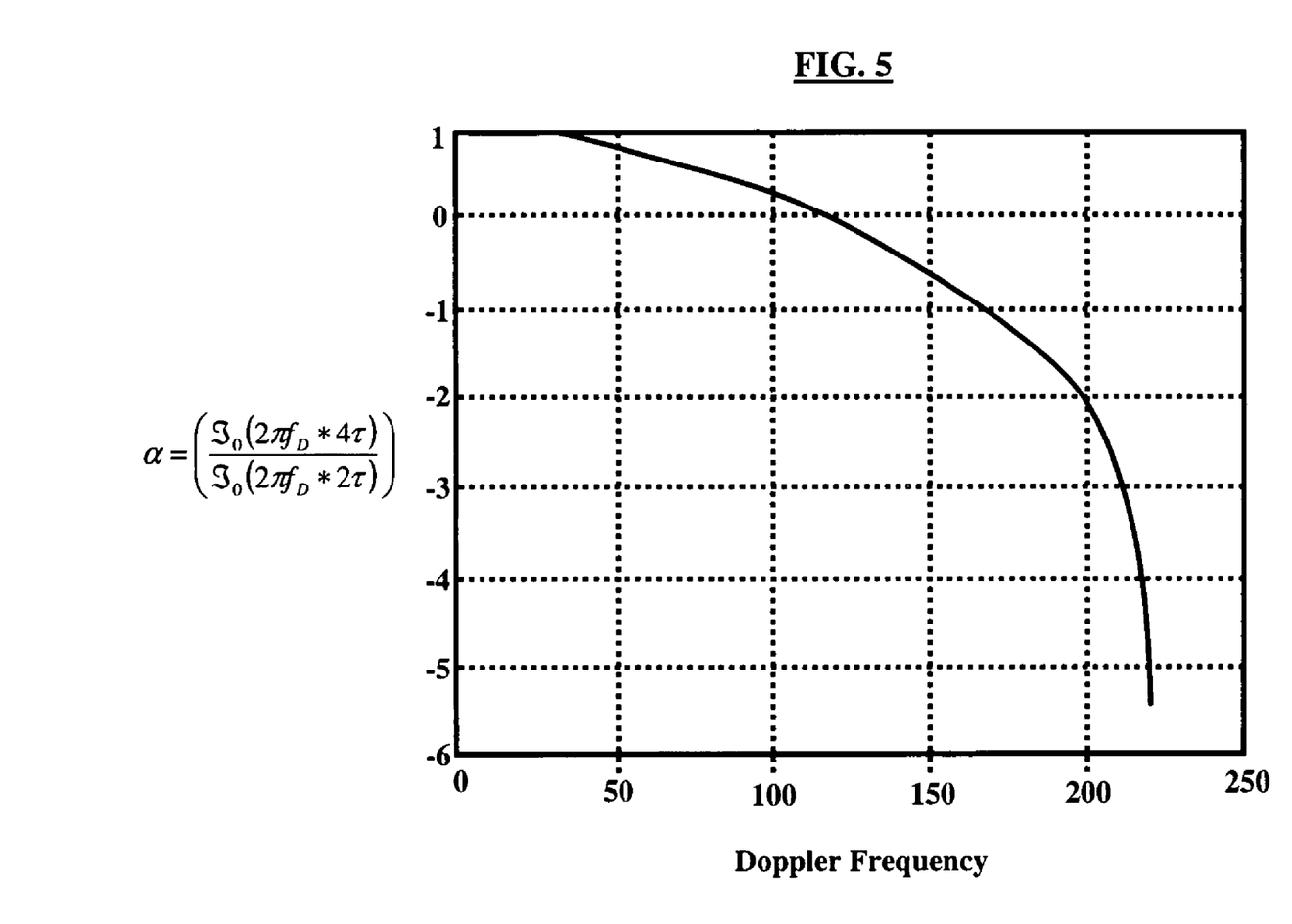
FIG. 5 is a graphical representation of values of the $\alpha$ range against the Doppler frequency range according to an embodiment herein.
Figure 6:
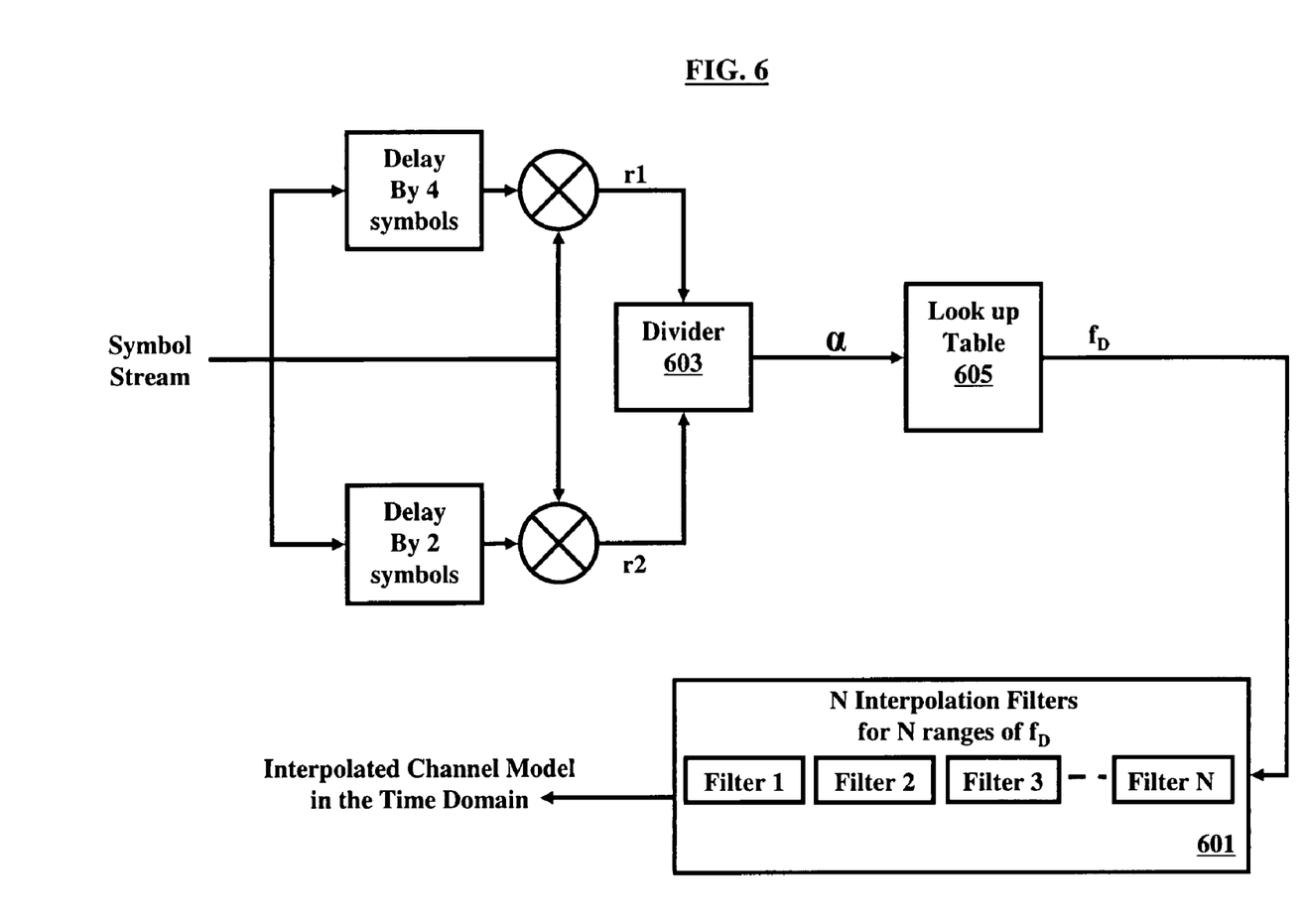
FIG. 6 is a schematic diagram of an apparatus according to an embodiment herein.

The calculated value of α is compared with the already stored value of α in a lookup table 605 (of FIG. 6) with the aid of the graph shown in the FIG. 5 to determine the value of $f_D$. In order to save memory and excess processing at the receiver end, the lookup table 605 (of FIG. 6) stored at the receiver 120 (of FIG. 1) maps α ranges corresponding to $f_D$ ranges to suitable interpolation filters 601 (of FIG. 6) directly such that when calculated α lies in one of the ranges the lookup table 605 (of FIG. 6) indicates the matching interpolation filter (i.e., Filter 1 . . . Filter N) directly.

If the interpolation filter 601 (of FIG. 6) depends only on instantaneous values of calculated α corresponding to instantaneous $f_D$ this may lead to errors in filter estimation. Thus, to minimize the errors in estimation a new value of α is determined as per following relation:

$$\alpha_{new} = \lambda * \alpha_{instantaneous} + (1-\lambda) * \alpha_{old} \quad (3)$$

where, λ is the dependency factor of $\alpha_{new}$ on instantaneous calculated α.

At the beginning of receiving the transmitted digital data flow in MediaFLO™ systems 100 (of FIG. 1) there are no previously calculated values of α, and this makes the value of λ large; i.e., $\alpha_{new} \approx \alpha_{instantaneous}$. This value is known as Geer Shifting. The value of λ is kept large during the acquisition stage. This is the stage in which the receiver 120 (of FIG. 1) synchronizes with the transmitter 110 (of FIG. 1) from which it is receiving transmission. Then, when steady state is reached λ is chosen to be small enough to avoid instantaneous changes' errors. During the steady state λ will have two values $\lambda_1$ and $\lambda_2$ where $\lambda_1 > \lambda_2$, choosing between them is as follows:

$$\lambda = \begin{cases} \lambda_1 & \text{when } f_D(n) > f_D(n-1) \\ \lambda_2 & \text{Else} \end{cases}$$

This means that during higher Doppler attack, λ is large; i.e., more dependency on instantaneous values of α in order to track quickly the Doppler Effect and move to a wider filter wide enough to avoid moving to a narrower filter too quickly such that the signal is distorted. The above equations may be processed using one or more processors 125 (of FIG. 1).

Figure 7:
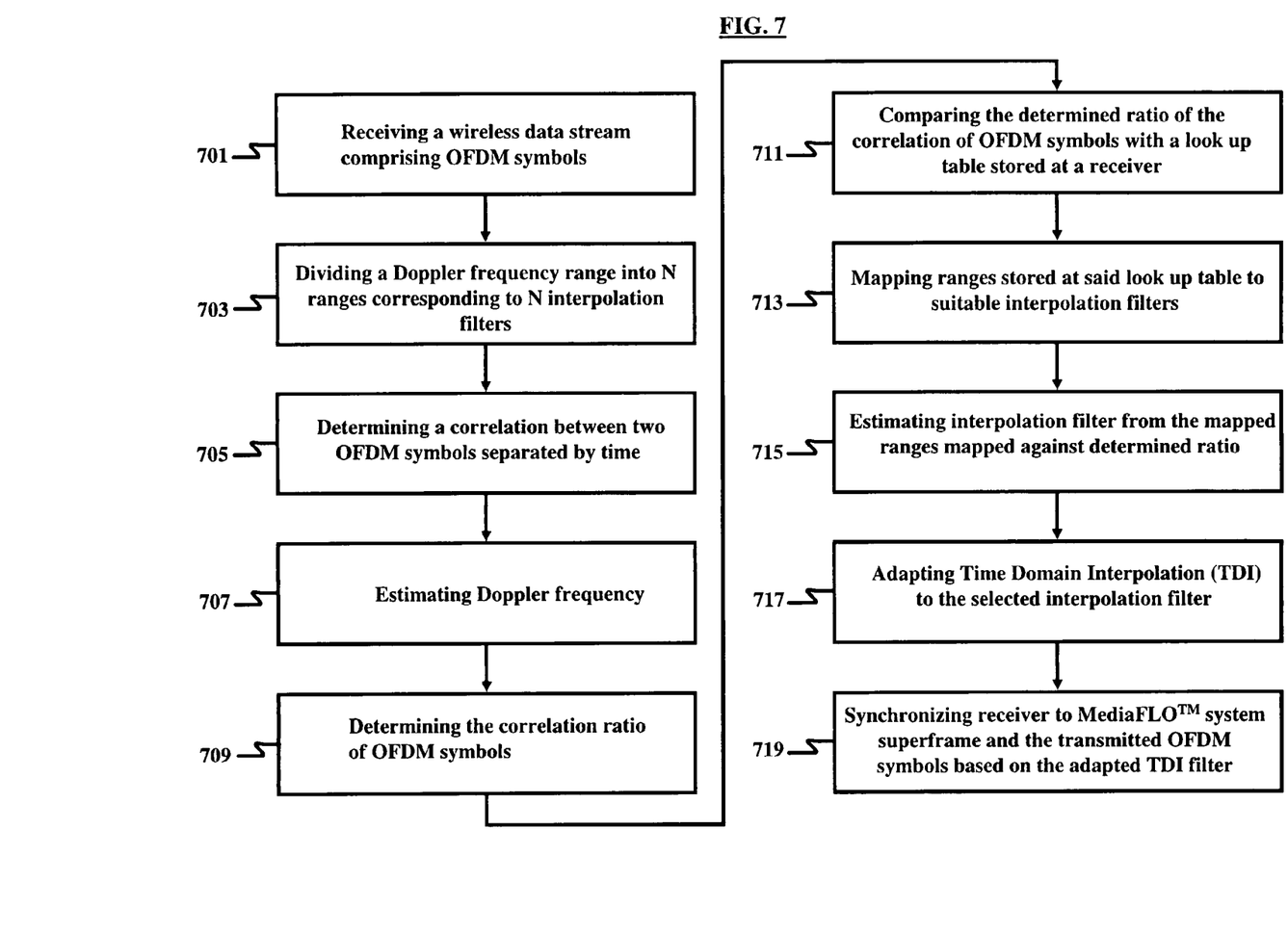
FIG. 7 is a flow diagram illustrating a preferred method according to an embodiment herein.

FIG. 7, with reference to FIGS. 1 through 6, is a flow diagram illustrating a method of Doppler frequency estimation and adaptation in a MediaFLO™ mobile multimedia multicast system 100 comprising a receiver 120 and a transmitter 110 according to an embodiment herein, wherein the method comprises receiving (701) a wireless data stream comprising a MediaFLO™ mobile multimedia multicast system superframe comprising OFDM symbols; dividing (703) a Doppler frequency range into N ranges corresponding to N interpolation filters 601; determining (705) a correlation between two OFDM symbols separated by time; estimating (707) a Doppler frequency by the correlation of OFDM symbols; determining (709) correlation ratio of OFDM symbols; comparing (711) the determined ratio of the correlation of OFDM symbols with a look up table 605 stored at the receiver 120 to determine a corresponding Doppler frequency; mapping (713) ranges stored at the look up table 605 to suitable interpolation filters 601; estimating (715) an interpolation filter from the mapped α ranges mapped against the determined α ratio; adapting (717) Time Domain Interpolation (TDI) to the selected interpolation filter; and synchronizing (719) the receiver 120 to the MediaFLO™ system superframe and the transmitted OFDM symbols based on the adapted TDI filter.

Preferably, the determining (705) a correlation $\Re(\tau)$ between two OFDM symbols separated by time τ is expressed by: $\Re(\tau) = E\lfloor h(n)h(n-\tau)* \rfloor = \sigma_h^2 \Im_0(2\pi f_D \tau)$, where $E\lfloor h(n)h(n-\tau)* \rfloor$ is an expectation value of symbols h(n) and symbol h(n−τ), $\sigma_h^2$ is a factor that depends on noise added to transmitted symbol h(n), and $\Im_0(2\pi f_D \tau)$ is a Bessel function of a first kind of order 0. Further, correlation $\Re(\tau)$ between two OFDM symbols comprises obtaining a correlation $r_1$ between OFDM symbols n and n+2 and obtaining a correlation $r_2$ between OFDM symbols n and n+4.

Further, the determining (709) the correlation α ratio of OFDM symbols further comprising, the value of α is based on instantaneously determined values of α. Further, for determining (705) the correlation $\Re(\tau)$ and determining (709) the correlation α ratio, computing α ratio of correlation of OFDM symbols based on $\alpha = (r2/r1) = (\Im_0(2\pi f_D * 4\tau)/\Im_0(2\pi f_D * 2\tau))$. Further, the instantaneously determined α is $\alpha_{instantaneous}$, and wherein determined α ratio is calculated by: $\alpha_{new} = \lambda * \alpha_{instantaneous} + (1-\lambda) * \alpha_{old}$, where λ is a dependency factor of $\alpha_{new}$ on instantaneous calculated α. The value of λ is large in a beginning stage in which receiver 120 synchronizes with a transmitter 110 and $\alpha_{new} \approx \alpha_{instantaneous}$.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
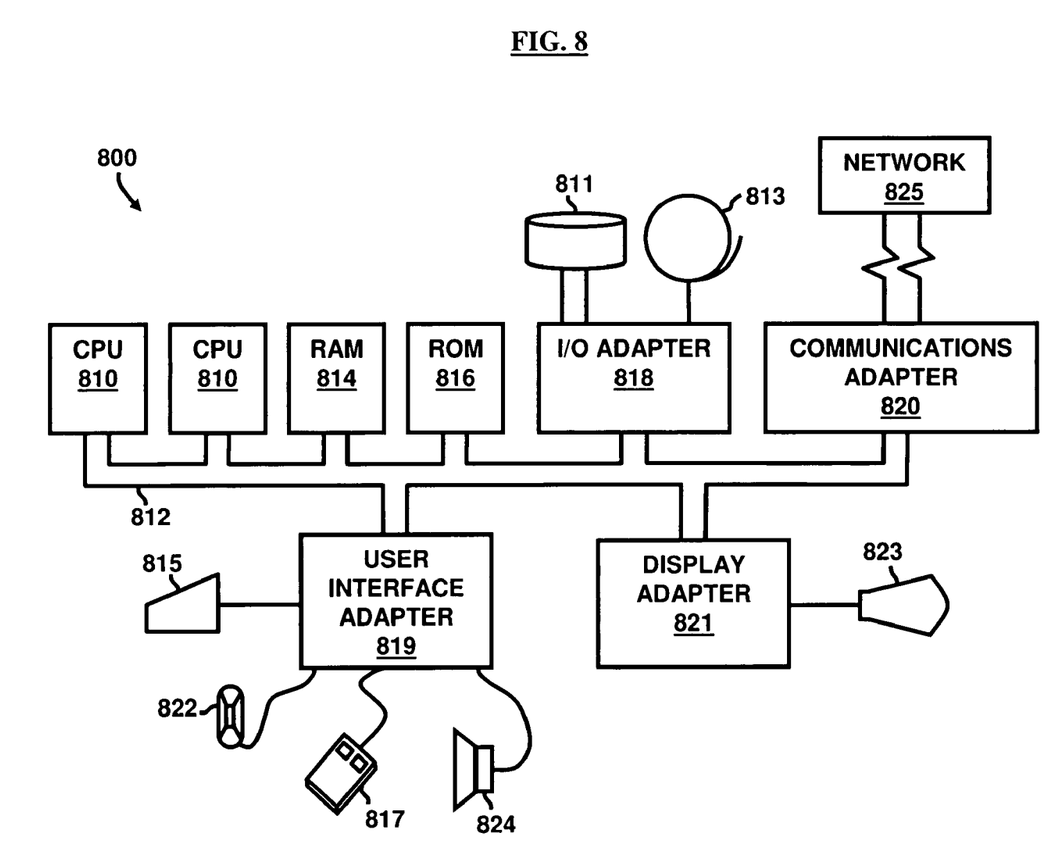
FIG. 8 illustrates a schematic diagram of a computer architecture used in accordance with the embodiments herein.

A representative hardware environment for practicing the embodiments herein is depicted in FIG. 8. This schematic drawing illustrates a hardware configuration of an information handling/computer system 800 in accordance with the embodiments herein. The system comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system 800. The system 800 can read the inventive instructions on the program storage devices and follow these instructions to execute the methodology of the embodiments herein. The system 800 further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for Doppler frequency estimation and adaptation in a mobile multimedia multicast system, said method comprising:
   receiving, in a receiver, a mobile multimedia multicast superframe comprising Orthogonal Frequency Division Multiplexing (OFDM) symbols;
   dividing a Doppler frequency range into N ranges corresponding to N interpolation filters, wherein said N is an integer;
   determining a correlation $\Re(\tau)$ between two OFDM symbols separated by time $\tau$;
   estimating a Doppler frequency $f_D$, by the correlation of OFDM symbols;
   determining an $\alpha$ ratio of the correlation of OFDM symbols;
   comparing the determined $\alpha$ ratio of the correlation of OFDM symbols with a look up table of $\alpha$ stored at said receiver to determine a corresponding Doppler frequency;
   mapping $\alpha$ ranges stored at said look up table to suitable interpolation filters;
   estimating an interpolation filter from the mapped $\alpha$ ranges mapped against said determined $\alpha$ ratio;
   adapting Time Domain Interpolation (TDI) to the estimated interpolation filter; and
   synchronizing said receiver to said mobile multimedia multicast superframe and the received OFDM symbols based on the adapted TDI filter.

2. The method of claim 1, wherein said correlation $\Re(\tau)$ between two OFDM symbols separated by time $\tau$ is expressed by: $\Re(\tau)=E\lfloor h(n)h(n-\tau)^*\rfloor=\sigma_h^2 \Im_0(2\pi f_D \tau)$, where $E\lfloor h(n)h(n-\tau)^*\rfloor$ is an expectation value of symbols $h(n)$ and symbol $h(n-\tau)$, $\sigma_h^2$ is a factor that depends on noise added to transmitted symbol $h(n)$, and $\Im_0(2\pi f_D \tau)$ is a Bessel function of a first kind of order 0.

3. The method of claim 1, wherein said correlation $\Re(\tau)$ between two OFDM symbols further comprises:
   obtaining a correlation $r_1$ between OFDM symbols n and n+2; and
   obtaining a correlation $r_2$ between OFDM symbols n and n+4,
   wherein n represents an OFDM symbol.

4. The method of claim 3, further comprising computing said $\alpha$ ratio of correlation of OFDM symbols based on: $\alpha=(r2/r1)=(\Im_0(2\pi f_D*4\tau)/\Im_0(2\pi f_D*2\tau))$,
   wherein $\alpha$ represents a ratio of r2/r1,
   wherein r1 represents the correlation between OFDM symbols n and n+2, wherein r2 represents the correlation between OFDM symbols n and n+4, wherein ($\mathfrak{S}_0(2\pi f_D*4\tau)$) represents a Bessel function of said OFDM symbols n and n+4, wherein ($\mathfrak{S}_0(2\pi f_D*2\tau)$) represents a Bessel function of said OFDM symbols n and n+2, wherein $f_D$ represents said Doppler frequency, and wherein $\tau$ represents time.

5. The method of claim 1, wherein said $\alpha$ ratio is based on instantaneously determined values of $\alpha$.

6. The method of claim 5, wherein said instantaneously determined $\alpha$ is $\alpha_{instantaneous}$, and wherein said determined $\alpha$ ratio is calculated by: $\alpha_{new}=\lambda*\alpha_{instantaneous}+(1-\lambda)*\alpha_{old}$, where $\lambda$ is a dependency factor of $\alpha_{new}$ on instantaneous calculated $\alpha$, wherein said $\alpha_{old}$ represents a previous value of said Doppler frequency.

7. The method of claim 6, wherein said $\lambda$ is large in a beginning stage in which said receiver synchronizes with a transmitter and $\alpha_{new} \approx \alpha_{instantaneous}$.

8. A non-transitory program storage device readable by computer, tangibly embodying a program of instructions executable by said computer to perform a method for Doppler frequency estimation and adaptation in a mobile multimedia multicast system, said method comprising:

receiving, in a receiver, a mobile multimedia multicast superframe comprising Orthogonal Frequency Division Multiplexing (OFDM) symbols;

dividing a Doppler frequency range into N ranges corresponding to N interpolation filters, wherein said N is an integer;

determining a correlation $\mathfrak{R}(\tau)$ between two OFDM symbols separated by time $\tau$;

estimating a Doppler frequency $f_D$ by the correlation of OFDM symbols;

determining an $\alpha$ ratio of the correlation of OFDM symbols;

comparing the determined $\alpha$ ratio of the correlation of OFDM symbols with a look up table of $\alpha$ stored at said receiver to determine a corresponding Doppler frequency;

mapping $\alpha$ ranges stored at said look up table to suitable interpolation filters;

estimating an interpolation filter from the mapped $\alpha$ ranges mapped against said determined $\alpha$ ratio;

adapting Time Domain Interpolation (TDI) to the estimated interpolation filter; and synchronizing said receiver to said mobile multimedia multicast superframe and the received OFDM symbols based on the adapted TDI filter.

9. The program storage device of claim 8, wherein said correlation $\mathfrak{R}(\tau)$ between two OFDM symbols separated by time $\tau$ is expressed by: $\mathfrak{R}(\tau)=E\lfloor h(n)h(n-\tau)*\rfloor=\sigma_h^2\mathfrak{S}_0(2\pi f_D\tau)$, where $E\lfloor h(n)h(n-\tau)*\rfloor$ is an expectation value of symbols h(n) and symbol h(n-$\tau$), $\sigma_h^2$ is a factor that depends on noise added to transmitted symbol h(n), and $\mathfrak{S}_0(2\pi f_D\tau)$ is a Bessel function of a first kind of order 0.

10. The program storage device of claim 8, wherein said correlation $\mathfrak{R}(\tau)$ between two OFDM symbols further comprises:

obtaining a correlation $r_1$ between OFDM symbols n and n+2; and obtaining a correlation $r_2$ between OFDM symbols n and n+4, wherein n represents an OFDM symbol.

11. The program storage device of claim 10, further comprising computing said $\alpha$ ratio of correlation of OFDM symbols based on:

$\alpha=(r2/r1)=(\mathfrak{S}_0(2\pi f_D*4\tau)/\mathfrak{S}_0(2\pi f_D*2\tau))$, wherein $\alpha$ represents a ratio of r2/r1, wherein r1 represents the correlation between OFDM symbols n and n+2, wherein r2 represents the correlation between OFDM symbols n and n+4, wherein ($\mathfrak{S}_0(2\pi f_D*4\tau)$) represents a Bessel function of said OFDM symbols n and n+4, wherein ($\mathfrak{S}_0(2\pi f_D*2\tau)$) represents a Bessel function of said OFDM symbols n and n+2, wherein $f_D$ represents said Doppler frequency, and wherein $\tau$ represents time.

12. The program storage device of claim 8, wherein said $\alpha$ ratio is based on instantaneously determined values of $\alpha$.

13. The program storage device of claim 12, wherein said instantaneously determined $\alpha$ is $\alpha_{instantaneous}$, and wherein said determined $\alpha$ ratio is calculated by: $\alpha_{new}=\lambda*\alpha_{instantaneous}+(1-\lambda)*\alpha_{old}$, where $\lambda$ is a dependency factor of $\alpha_{new}$ on instantaneous calculated $\alpha$, wherein said $\alpha_{old}$ represents a previous value of said Doppler frequency.

14. The program storage device of claim 13, wherein said $\lambda$ is large in a beginning stage in which said receiver synchronizes with a transmitter and $\alpha_{new} \approx \alpha_{instantaneous}$.

15. An apparatus for performing Doppler frequency estimation and adaptation in a mobile multimedia multicast system, said apparatus comprising:

a receiver that receives a mobile multimedia multicast superframe comprising Orthogonal Frequency Division Multiplexing (OFDM) symbols; and a processor that:

divides a Doppler frequency range into N ranges corresponding to N interpolation filters, wherein said N is an integer;

determines a correlation $\mathfrak{R}(\tau)$ between two OFDM symbols separated by time $\tau$;

estimates a Doppler frequency $f_D$ by the correlation of OFDM symbols;

determines an $\alpha$ ratio of the correlation of OFDM symbols;

compares the determined $\alpha$ ratio of the correlation of OFDM symbols with a look up table of $\alpha$ stored at said receiver to determine a corresponding Doppler frequency;

maps $\alpha$ ranges stored at said look up table to suitable interpolation filters;

estimates an interpolation filter from the mapped $\alpha$ ranges mapped against said determined $\alpha$ ratio;

adapts Time Domain Interpolation (TDI) to the estimated interpolation filter; and synchronizes said receiver to said mobile multimedia multicast superframe and the received OFDM symbols based on the adapted TDI filter.

16. The apparatus of claim 15, wherein said correlation $\mathfrak{R}(\tau)$ between two OFDM symbols separated by time $\tau$ is expressed by: $\mathfrak{R}(\tau)=E\lfloor h(n)h(n-\tau)*\rfloor=\sigma_h^2\mathfrak{S}_0(2\pi f_D\tau)$, where $E\lfloor h(n)h(n-\tau)*\rfloor$ is an expectation value of symbols h(n) and symbol h(n-$\tau$), $\sigma_h^2$ is a factor that depends on noise added to transmitted symbol h(n), and $\mathfrak{S}_0(2\pi f_D\tau)$ is a Bessel function of a first kind of order 0.

17. The apparatus of claim 15, wherein said correlation $\mathfrak{R}(\tau)$ between two OFDM symbols further comprises:

obtaining a correlation $r_1$ between OFDM symbols n and n+2; and obtaining a correlation $r_2$ between OFDM symbols n and n+4, wherein n represents an OFDM symbol.

18. The apparatus of claim 17, wherein said processor computes said $\alpha$ ratio of correlation of OFDM symbols based on: $\alpha=(r2/r1)=(\Im_0(2\pi f_D*4\tau)/\Im_0(2\pi f_D*2\tau))$,
wherein $\alpha$ represents a ratio of r2/r1,
wherein r1 represents the correlation between OFDM symbols n and n+2,
wherein r2 represents the correlation between OFDM symbols n and n+4,
wherein $(\Im_0(2\pi f_D*4\tau))$ represents a Bessel function of said OFDM symbols n and n+4,
wherein $(\Im_0(2\pi f_D*2\tau))$ represents a Bessel function of said OFDM symbols n and n+2,
wherein $f_D$ represents said Doppler frequency, and
wherein $\tau$ represents time.

19. The apparatus of claim 15, wherein said $\alpha$ ratio is based on instantaneously determined values of $\alpha$.

20. The apparatus of claim 19, wherein said instantaneously determined $\alpha$ is $\alpha_{instantaneous}$, wherein said determined $\alpha$ ratio is calculated by: $\alpha_{new}=\lambda*\alpha_{instantaneous}+(1-\lambda)*\alpha_{old}$, where $\lambda$ is a dependency factor of $\alpha_{new}$ on instantaneous calculated $\alpha$, wherein said $\alpha_{old}$ represents a previous value of said Doppler frequency, and wherein said $\lambda$ is large in a beginning stage in which said receiver synchronizes with a transmitter and $\alpha_{new} \approx \alpha_{instantaneous}$.

* * * * *